(12) United States Patent
Takemoto et al.

(10) Patent No.: US 11,548,629 B2
(45) Date of Patent: Jan. 10, 2023

(54) MOTOR, ROTOR DEVICE, AND DRONE

(71) Applicant: Nidec Corporation, Kyoto (JP)

(72) Inventors: Shinji Takemoto, Kyoto (JP); Kosuke Mizuike, Kyoto (JP); Yoshitsugu Sasaguri, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 466 days.

(21) Appl. No.: 16/793,060

(22) Filed: Feb. 18, 2020

(65) Prior Publication Data

US 2020/0307778 A1 Oct. 1, 2020

(30) Foreign Application Priority Data

Mar. 28, 2019 (JP) .............................. JP2019-064936

(51) Int. Cl.
  *B64C 27/12* (2006.01)
  *B64C 39/02* (2006.01)
  *B64C 27/08* (2006.01)

(52) U.S. Cl.
  CPC .............. *B64C 27/12* (2013.01); *B64C 27/08* (2013.01); *B64C 39/024* (2013.01); *B64C 2201/042* (2013.01); *B64C 2201/108* (2013.01); *B64C 2201/16* (2013.01)

(58) Field of Classification Search
  CPC ....... B64C 27/12; B64C 27/08; B64C 39/024; B64C 2201/042; B64C 2201/108; B64C 2201/16; B64C 27/001; B64C 2201/024; B64C 27/14; H02K 7/04; H02K 5/04; H02K 7/14; F04D 29/662
  See application file for complete search history.

(56) References Cited

U.S. PATENT DOCUMENTS

| | | | | |
|---|---|---|---|---|
| 4,025,246 A | * | 5/1977 | Normandin | F01C 21/0809 60/485 |
| 4,893,044 A | * | 1/1990 | Bush | F04C 29/0021 464/180 |
| 4,900,237 A | * | 2/1990 | Reedy | F04C 29/0085 366/128 |
| 5,367,909 A | * | 11/1994 | Heilman | F16F 15/32 73/462 |
| 5,481,142 A | * | 1/1996 | James | F16F 15/145 310/51 |
| 5,959,383 A | * | 9/1999 | Winzen | D01H 4/12 310/90 |
| 5,964,584 A | * | 10/1999 | Lorentz | F04C 2/3441 418/184 |
| 6,351,043 B1 | * | 2/2002 | Wolf | H02K 7/04 310/261.1 |

(Continued)

FOREIGN PATENT DOCUMENTS

| CN | 1292593 A | 4/2001 |
|---|---|---|
| CN | 104061189 A | 9/2014 |

(Continued)

*Primary Examiner* — Medhat Badawi

(74) *Attorney, Agent, or Firm* — Keating & Bennett

(57) ABSTRACT

A motor mounted on a drone includes a rotor including a propeller mounting portion with a propeller detachably attached, the rotor being rotatable about a central axis, a stator radially facing the rotor with a gap therebetween, and an auto-balancer capable of automatically correcting dynamic balance of the rotor.

10 Claims, 2 Drawing Sheets

(56) References Cited

U.S. PATENT DOCUMENTS

| | | | | |
|---|---|---|---|---|
| 7,724,468 | B2* | 5/2010 | Fu | G11B 33/08 |
| | | | | 360/98.07 |
| 7,786,628 | B2* | 8/2010 | Childe | H02K 29/10 |
| | | | | 310/68 B |
| 8,952,559 | B2* | 2/2015 | Holstein | F03B 13/083 |
| | | | | 290/52 |
| 9,188,115 | B2* | 11/2015 | Fukasaku | H02K 7/04 |
| 10,400,793 | B2* | 9/2019 | Chang | F04D 29/662 |
| 2006/0269412 | A1* | 11/2006 | Yu | F04D 29/662 |
| | | | | 416/144 |
| 2008/0063526 | A1* | 3/2008 | He | F04D 29/329 |
| | | | | 416/144 |
| 2008/0075596 | A1* | 3/2008 | Kitamura | F04D 29/662 |
| | | | | 416/145 |
| 2019/0234427 | A1* | 8/2019 | Chang | F04D 29/662 |
| 2020/0115049 | A1* | 4/2020 | Nakamura | B64D 17/54 |
| 2020/0307778 | A1* | 10/2020 | Takemoto | B64C 27/12 |

FOREIGN PATENT DOCUMENTS

| | | |
|---|---|---|
| CN | 108005964 A | 5/2018 |
| JP | 2019-028436 A | 2/2019 |

\* cited by examiner

MOTOR, ROTOR DEVICE, AND DRONE

CROSS REFERENCE TO RELATED APPLICATION

The present invention claims priority under 35 U.S.C. § 119 to Japanese Application No. 2019-064936 filed on Mar. 28, 2019, the entire contents of which are hereby incorporated herein by reference.

1. Field of the Invention

The present disclosure relates to a motor, a rotor device, and a drone.

2. Background

Conventionally, there is a drone including a propeller and a motor that rotates the propeller. For example, there is a conventional drone provided with a microphone and a speaker.

Some conventional drones are configured such that a propeller is detachably attached to a rotor of a motor. In this case, the rotor with the propeller attached is likely to be unbalanced due to low attachment accuracy of the propeller, or the like. This may cause the rotor to vibrate, so that the motor may deteriorate in reliability.

SUMMARY

One example embodiment of a motor of the present disclosure is a motor mounted on a drone, including a rotor including a propeller mounting portion with a propeller detachably attached, the rotor being rotatable about a central axis, a stator radially facing the rotor with a gap therebetween, and an auto-balancer capable of automatically correcting dynamic balance of the rotor.

One example embodiment of a rotor device of the present disclosure includes the motor described above and the propeller.

One example embodiment of a drone of the present disclosure includes the rotor device described above.

The above and other elements, features, steps, characteristics and advantages of the present disclosure will become more apparent from the following detailed description of the example embodiments with reference to the attached drawings.

DETAILED DESCRIPTION

Each drawing appropriately indicates Z-axis direction that is a vertical direction with a positive side being an "upper side" and a negative side being a "lower side". Each drawing appropriately indicates a central axis J that is a virtual line parallel to the Z-axis direction and extending in the vertical direction. In the following description, an axial direction of the central axis J, i.e., a direction parallel to the vertical direction, is simply referred to as "axial direction", a radial direction about the central axis J is simply referred to as "radial direction", and a circumferential direction about the central axis J is simply referred to as "circumferential direction".

In the following example embodiments, the upper side corresponds to one side in the axial direction, and the lower side corresponds to the other side in the axial direction. The vertical direction, the upper side, and the lower side are simply names for describing a placement relationship of each part, and an actual placement relationship may be other than the placement relationship indicated by these names.

Herein, the description, "extending in the axial direction", refers to not only a case of strictly extending in the axial direction, but also a case of extending in a direction inclined at less than 45° relative to the axial direction. In addition, herein, the description, "extending in the radial direction", refers to not only a case of strictly extending in the radial direction, i.e., in a direction perpendicular to the axial direction, but also a case of extending in a direction inclined at less than 45° relative to the radial direction.

Figure 1:
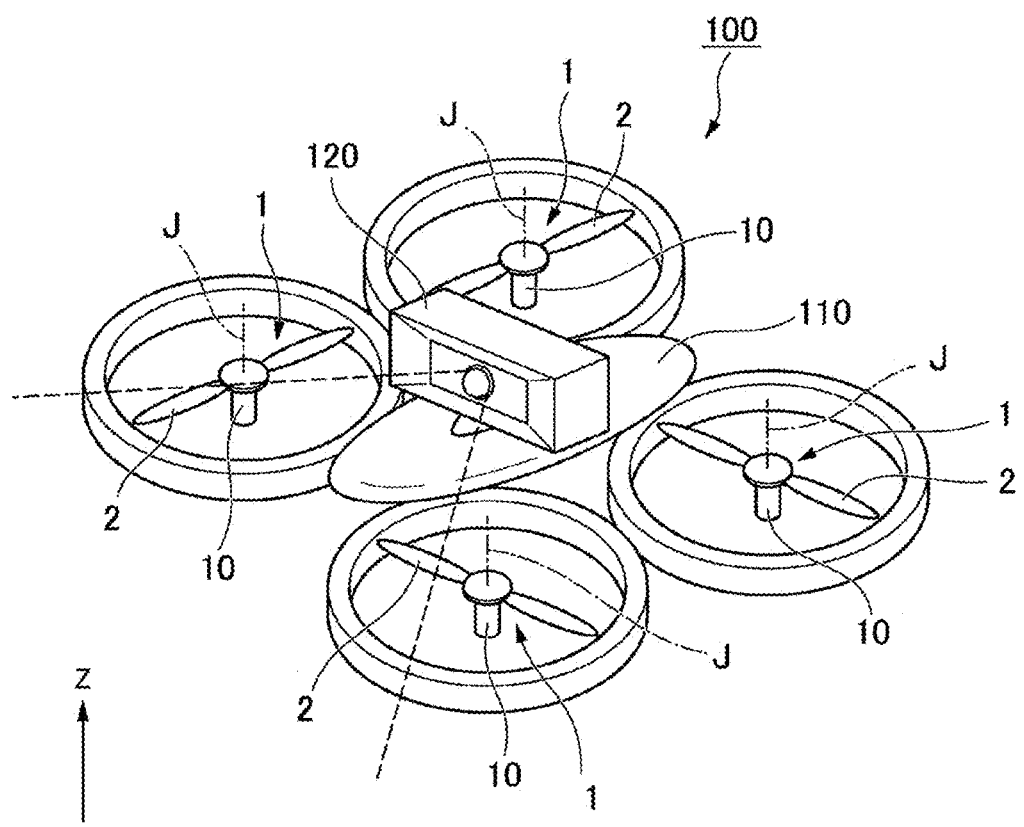
FIG. 1 is a perspective view schematically illustrating a drone of an example embodiment of the present disclosure.

As illustrated in FIG. 1, a drone 100 of the present example embodiment includes a main body 110, an imaging device 120, and a rotor device 1. The imaging device 120 and the rotor device 1 are attached to the main body 110. The rotor device 1 generates a propulsive force of the drone 100. In the present example embodiment, a plurality of the rotor devices 1 is provided. For example, four rotor devices 1 are provided.

Figure 2:
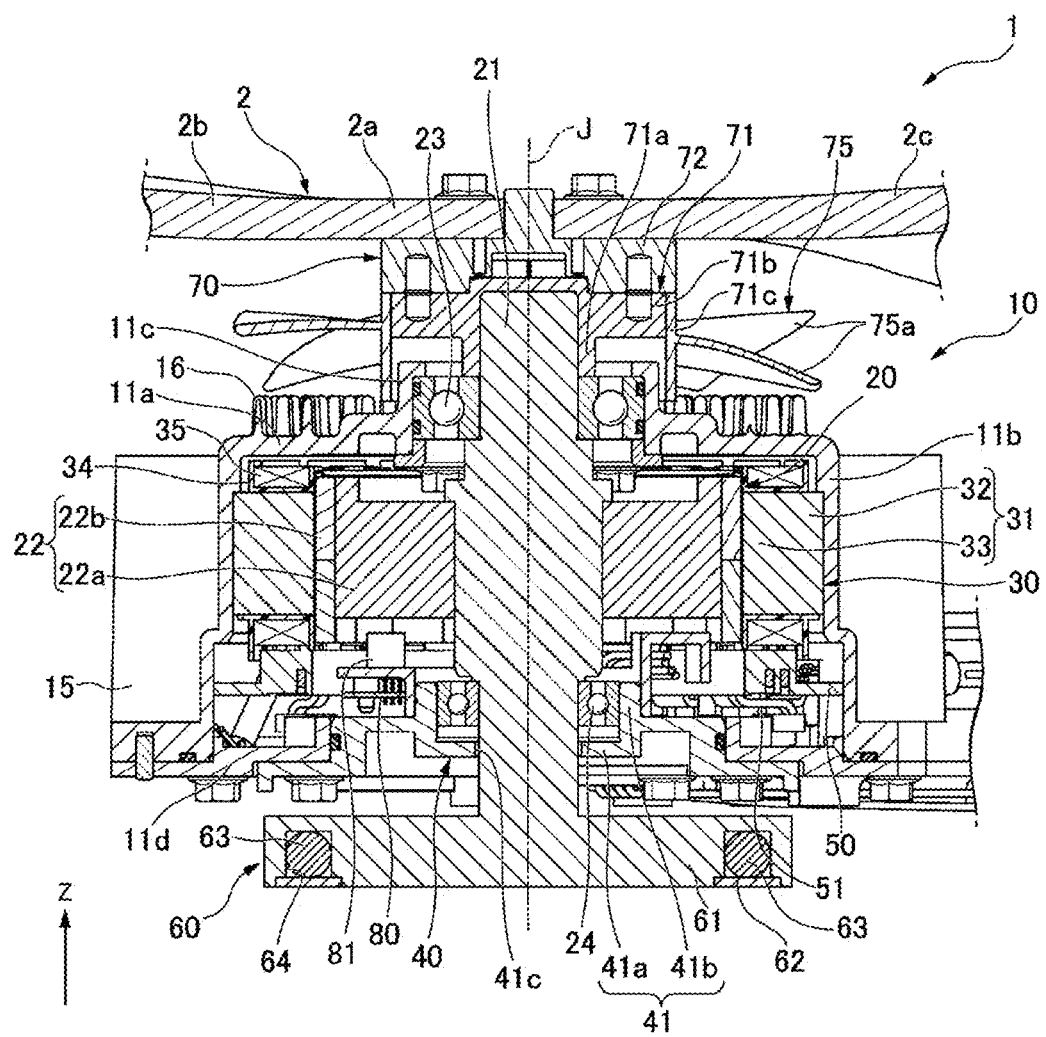
FIG. 2 is a cross-sectional view illustrating a rotor device of an example embodiment of the present disclosure.

As illustrated in FIG. 2, the rotor device 1 includes a motor 10, a propeller 2, and a fan 75. In the present example embodiment, the motor 10 is an inner-rotor type motor. The motor 10 includes a housing 11, a bearing holder 40, a rotor 20, a stator 30, bearings 23 and 24, a bus bar holder 50, a bus bar 51, a circuit board 80, a hall sensor 81, and an auto-balancer 60.

The housing 11 accommodates the rotor 20, the stator 30, the bearings 23 and 24, the bus bar holder 50, the bus bar 51, the circuit board 80, and the hall sensor 81 therein. In the present example embodiment, the housing 11 has a cylindrical shape about the central axis J and opens downward.

The housing 11 includes a top wall portion 11a, a tubular portion 11b, a holding portion 11c, a bottom wall portion 11d, a plurality of side surface fins 15, and a plurality of upper surface fins 16. In the present example embodiment, the top wall portion 11a, the tubular portion 11b, the holding portion 11c, the side surface fins 15, and the upper surface fins 16 are each a part of the same single member. That is, the top wall portion 11a, the tubular portion 11b, the holding portion 11c, the side surface fins 15, and the upper surface fins 16 are integrally formed. The bottom wall portion 11d is a separate member from the single member including the top wall portion 11a, the tubular portion 11b, the holding portion 11c, the side surface fins 15, and the upper surface fins 16, and is fixed to the single member.

The top wall portion 11a is positioned above the stator 30 to cover the upper side of the stator 30. The top wall portion 11a is positioned below the propeller 2 and the fan 75. In the present example embodiment, the top wall portion 11a faces the fan 75 in the axial direction with a gap therebetween. The top wall portion 11a has an annular plate shape about the central axis J. The top wall portion 11a is provided on its upper surface with the plurality of upper surface fins 16. The plurality of upper surface fins 16 protrudes upward from the upper surface of the top wall portion 11a. The upper surface fins 16 are each in a cylindrical columnar shape, for example. The plurality of upper surface fins 16 is disposed in a region having an annular shape surrounding the central axis J in the circumferential direction.

The tubular portion 11b extends downward from a radially outer peripheral edge portion of the top wall portion 11a. The tubular portion 11b has a cylindrical shape about the central axis J and opens downward. The stator 30 is fixed to an inner peripheral surface of the tubular portion 11b. The plurality of side surface fins 15 is provided on an outer peripheral surface of the tubular portion 11b along the circumferential direction. The side surface fins 15 are each in a plate-like shape with a plate surface facing the circumferential direction, for example. Although not illustrated, the plurality of side surface fins 15 is disposed at equal intervals throughout the entire circumference in the circumferential direction. The holding portion 11c protrudes upward from a radially inner peripheral edge portion of the top wall portion 11a. The bearing 23 is held inside the holding portion 11c in the radial direction.

The bottom wall portion 11d is fixed to a lower end portion of the tubular portion 11b. The bottom wall portion 11d protrudes radially inward from the lower end portion of the tubular portion 11b. The bottom wall portion 11d is positioned below the stator 30 to cover a lower side of the stator 30. The bottom wall portion 11d has an annular plate shape about the central axis J. The bottom wall portion 11d has a radially outer peripheral edge portion fixed to the lower end portion of the tubular portion 11b with a screw, for example. The bottom wall portion 11d includes a radially inner opening that is a lower opening of the housing 11.

The bearing holder 40 is fixed in the lower opening of the housing 11. More specifically, the bearing holder 40 is fixed in the radially inner opening of the bottom wall portion 11d. The bearing holder 40 closes the radially inner opening of the bottom wall portion 11d from below. The bearing holder 40 has a holding portion 41 in a cylindrical shape that opens upward.

The holding portion 41 has a bottom portion 41a and a tubular portion 41b. The bottom portion 41a has a disk-like shape about the central axis J, for example. The bottom portion 41a is provided with a hole 41c passing through the bottom portion 41a in the axial direction. The hole 41c has a circular shape about the central axis J, for example. The tubular portion 41b has a cylindrical shape about the central axis J, extending upward from a radially outer peripheral edge portion of the bottom portion 41a. The bearing 24 is held inside the tubular portion 41b in the radial direction.

The rotor 20 is rotatable about the central axis J. The rotor 20 includes a shaft 21, a rotor body 22, and a propeller mounting part 70. The shaft 21 is disposed along the central axis J. The shaft 21 has a cylindrical columnar shape about the central axis J. The shaft 21 is supported by the bearings 23 and 24 in a rotatable manner about the central axis J. The shaft 21 has an upper end portion protruding above the housing 11 through the inside of the top wall portion 11a of the housing 11 in the radial direction and the inside of the holding portion 11c. The shaft 21 has a lower end portion protruding below the housing 11 through a hole 41c provided in the bearing holder 40.

The rotor body 22 is fixed to the shaft 21. The rotor body 22 includes a rotor core 22a fixed to an outer peripheral surface of the shaft 21, and a rotor magnet 22b fixed to an outer peripheral surface of the rotor core 22a.

The propeller mounting part 70 is provided on the shaft 21 in its portion positioned above its portion with the rotor body fixed. In the present example embodiment, the propeller mounting part 70 is fixed to a leading end portion of the shaft 21, protruding upward from the housing 11. The propeller mounting part 70 includes an attachment member 71 connected to the shaft 21 and a connection member 72 fixed to an upper side of the attachment member 71.

The attachment member 71 includes a shaft portion 71a in a cylindrical shape extending in the axial direction along the shaft 21, a flange portion 71b extending radially outward from an outer peripheral surface of the shaft portion 71a, and a tubular portion 71c in a cylindrical shape, fixed to a radially outer end of the flange portion 71b. The fan 75 is fixed to the tubular portion 71c. The fan 75 has a plurality of blades 75a extending radially outward from an outer peripheral surface of the tubular portion 71c. The fan 75 is positioned between the propeller 2 and the top wall portion 11a in the axial direction. In the present example embodiment, the fan 75 is an axial fan that blows air in the axial direction.

In the present example embodiment, the attachment member and the fan 75 are produced by insert molding. The shaft portion 71a and the flange portion 71b are a single member made of metal. The tubular portion 71c and the fan 75 are each a part of a single resin member. The fan 75 has an outer diameter smaller than an outer diameter of the propeller 2. This structure enables suppressing interference between the propeller 2 and the fan 75. In addition, an increase in weight of the rotor device 1 can be suppressed.

The connecting member 72 is fixed to an upper surface of the attachment member 71. The connecting member 72 is a disk-like member, and is fixed to the attachment member 71 with a screw. The propeller 2 is fixed to an upper surface of the connecting member 72 with a screw. Accordingly, the propeller 2 is detachably attached to the propeller mounting part 70.

The propeller 2 includes a hub 2a positioned in its central portion as viewed in the axial direction, and two blades 2b and 2c extending radially outward from the hub 2a. The hub 2a has a plate-like shape with upper and lower surfaces that are flat. The hub 2a has a through hole passing through it in the axial direction. The propeller 2 is fixed to the connecting member 72 by a screw having passed through the through hole of the hub 2a.

The stator 30 radially faces the rotor 20 with a gap therebetween. In the present example embodiment, the stator 30 surrounds the rotor 20 from radially outside the rotor 20. The stator 30 includes a stator core 31, an insulator 34, and a plurality of coils 35. The stator core 31 has an annular shape that surrounds the rotor body 22 from radially outside the rotor body 22. The stator core 31 includes a core back 32 and a plurality of teeth 33. The core back 32 has an annular shape about the central axis J. The teeth 33 protrude radially inward from the core back 32. The plurality of teeth 33 is disposed at equal intervals throughout the entire circumference in the circumferential direction.

The insulator 34 is a member that insulates the coil 35 from the stator core 31. The insulator 34 is attached to each of the plurality of teeth 33. The plurality of coils 35 is attached to each of the plurality of teeth 33 with the insulator 34 interposed therebetween.

Although not illustrated, in the present example embodiment, the coil 35 is resin-molded together with the stator core 31 and the insulator 34, for example. The mold resin has an upper end surface in contact with a lower surface of the top wall portion 11a. That is, the coil 35 and the top wall portion 11a are thermally connected by the mold resin. A part of heat generated in the coil 35 is transmitted to the upper surface fins 16 through the resin mold and the top wall portion 11a, and is radiated from the upper surface fins 16.

The bus bar holder 50 is disposed below the stator 30. The bus bar holder 50 holds a plurality of the bus bars 51. The bus bars 51 are connected to respective lead wires extending from the plurality of coils 35.

The circuit board 80 has a plate-like shape extending in the radial direction. The circuit board 80 is disposed below the stator 30. In the present example embodiment, the circuit board 80 is disposed radially outward of the tubular portion 41*b*. The hall sensor 81 is attached to an upper surface of the circuit board 80. The hall sensor 81 detects a magnetic field of the rotor magnet 22*b*. Although not illustrated, a plurality of the hall sensors 81 is provided along the circumferential direction.

The auto-balancer 60 is a device capable of automatically correcting dynamic balance of the rotor 20. In the present example embodiment, the auto-balancer 60 is provided on the shaft 21 in its portion positioned below its portion with the rotor body 22 fixed. More specifically, the auto-balancer 60 is provided at a lower end of the shaft 21. The auto-balancer 60 is positioned outside the housing 11. The auto-balancer 60 is positioned below the bearing holder 40. The auto-balancer 60 faces the bearing holder 40 in the axial direction with a gap therebetween. The auto-balancer 60 includes a base 61, a lid 62, and a movable body 63.

The base 61 is provided on the shaft 21 in its portion protruding below the housing 11. The base 61 extends radially outward from the lower end of the shaft 21. The base 61 has a circular shape about the central axis J as viewed in the axial direction, for example. The base 61 has a radially outer peripheral edge portion that is a radially outer peripheral edge portion of the auto-balancer 60 and that is positioned radially outward of a radially inner peripheral edge portion of the stator 30. In the present example embodiment, the radially inner peripheral edge portion of the stator 30 includes radially inner peripheral edge portions of the respective teeth 33.

The radially outer peripheral edge portion of the base 61 is positioned radially inward of a radially outer end portion of the housing 11. Accordingly, the radially outer peripheral edge portion of the auto-balancer 60 is positioned radially inward of the radially outer end portion of the housing 11. Thus, even when the auto-balancer 60 is provided, the motor 10 does not increase in size in the radial direction. In the present example embodiment, the radially outer end portion of the housing 11 includes a radially outer end portion of the side surface fin 15. In the present example embodiment, the radially outer peripheral edge portion of the base 61 is positioned radially inward of an inner peripheral surface of the tubular portion 11*b*. In the present example embodiment, the base 61 is integrally formed with the shaft 21.

The base 61 has a housing portion 64 in which the movable body 63 is housed. The housing portion 64 has an annular shape about the central axis J. The housing portion 64 is provided in the radially outer peripheral edge portion of the base 61. In the present example embodiment, the housing portion 64 is an annular groove that is recessed upward from a lower surface of the base 61. In the present example embodiment, a radially outer peripheral edge portion of the housing portion 64 is positioned radially outward of the radially inner peripheral edge portion of the stator 30. In the present example embodiment, the radially outer peripheral edge portion of the housing portion 64 is positioned radially inward of the inner peripheral surface of the tubular portion 11*b*.

The lid 62 is fixed to the lower surface of the base 61. The lid 62 has an annular shape about the central axis J. The lid 62 is in a plate-like shape with a plate surface facing the axial direction. The lid 62 closes a lower opening of the housing portion 64. Accordingly, the movable body 63 housed in the housing portion 64 can be prevented from dropping off. The lid 62 supports the movable body 63 from below.

The movable body 63 is disposed inside the housing portion 64 in a movable manner in the circumferential direction. In the present example embodiment, the movable body 63 is a sphere. The movable body 63 has an outer diameter that is substantially equal to a radial dimension and an axial dimension inside the housing portion 64. As long as the movable body 63 is movable in the circumferential direction inside the housing portion 64, a gap may be provided or not between the movable body 63 and an inner surface of the housing portion 64.

In the present example embodiment, a plurality of the movable bodies 63 is provided. The number of the movable bodies 63 is such a number that the movable bodies 63 are not spread inside the housing portion 64. That is, the movable body 63 is not provided at any circumferential position inside the housing portion 64. The movable body 63 is made of metal such as iron, for example.

When the propeller 2 is detachably attached to the rotor 20 as in the present example embodiment, an installation error of the propeller 2, an individual difference of the propeller 2, or the like may cause an unbalance in the rotor 20 with the propeller 2 attached. When the rotor 20 is unbalanced, the rotor 20 vibrates, and thus the motor 10, the rotor device 1, and the drone 100 may be deteriorated in reliability. In addition, noise may be generated from the motor 10, the rotor device 1, and the drone 100.

In contrast, according to the present example embodiment, there is provided the auto-balancer 60 capable of automatically correcting dynamic balance of the rotor 20. Accordingly, even when the rotor 20 is unbalanced, the auto-balancer 60 can correct the unbalance of the rotor 20. Thus, according to this example embodiment, vibration of the rotor 20 with the propeller 2 detachably attached can be suppressed. This enables improvement in reliability of the motor 10, the rotor device 1, and the drone 100. In addition, noise generated from the motor 10, the rotor device 1, and the drone 100 can be suppressed.

Specifically, when the rotor 20 with the propeller 2 attached is unbalanced, the rotor 20 rotating at a certain rotational speed causes the movable body 63 housed in the housing portion 64 to move to a position symmetrical to a circumferential position, at which the unbalance occurs, across the central axis J in the rotor 20. Accordingly, the unbalance of the rotor 20 is corrected by the movable body 63. In this way, the auto-balancer 60 can automatically correct the dynamic balance of the rotor 20.

In addition, for example, when the plurality of rotor devices 1 is mounted on the drone 100 as in the present example embodiment, vibration generated from the rotor 20 of each of the rotor devices 1 is likely to increase vibration generated in the entire drone 100 in particular. Thus, an effect of enabling suppression of the vibration of the rotor 20 described above can be usefully obtained particularly in the drone 100 provided with the plurality of rotor devices 1.

According to the present example embodiment, the propeller mounting part 70 with the propeller 2 attached is provided on the shaft 21 in its portion positioned above its portion with the rotor body 22 fixed. The auto-balancer 60 is provided on the shaft 21 in its portion positioned below its portion with the rotor body 22 fixed. That is, in the present example embodiment, the auto-balancer 60 is provided on the shaft 21 on its side opposite to that with the propeller 2 attached. This enables air flowing downward from the propeller 2 to be prevented from being blocked by the auto-balancer 60. Accordingly, the air flowing downward from the propeller 2 can be fed to an upper surface of the housing 11, and the housing 11 can be cooled. Thus, heat transferred from the stator 30 to the housing 11 can be suitably released to the outside of the motor 10.

When the auto-balancer 60 is provided on the shaft 21 on its side opposite to that with the propeller 2 attached, a space for providing the fan 75 between the propeller 2 and the housing can be secured as in the present example embodiment. This enables also the fan 75 to feed air to the upper surface of the housing 11, so that the housing 11 can be cooled more suitably. For example, the amount of air fed from the propeller 2 to the upper surface of the housing 11 is likely to decrease in a radially inner portion of the propeller 2, so that the amount of air to be fed to the upper surface of the housing 11 can be suitably increased by providing the fan 75.

In the present example embodiment, the plurality of upper surface fins 16 is provided on the upper surface of the housing 11, i.e., the upper surface of the top wall portion 11a. This allows the propeller 2 and the fan 75 to feed air to the upper surface of the housing 11, so that heat dissipation from the upper surface fins 16 is further promoted. Accordingly, the housing 11 can be cooled more suitably.

According to the present example embodiment, the radially outer peripheral edge portion of the housing portion 64 is positioned radially outward of the radially inner peripheral edge portion of the stator 30. This enables increasing a radial distance from the central axis J to the movable body 63 housed in the housing portion 64. Accordingly, the moment applied to the rotor 20 by each movable body 63 can be increased, so that a balance adjustment function of the rotor 20 using each movable body 63 can be improved. Thus, even when the number of movable bodies 63 is reduced, the dynamic balance of the rotor 20 can be corrected. This enables vibration of the rotor 20 to be suppressed while the motor 10 is reduced in mass.

In addition, according to the present example embodiment, the base 61 and the shaft 21 are integrally formed. This enables the auto-balancer 60 to be provided on the shaft 21 with high positional accuracy. Accordingly, the auto-balancer 60 can more suitably correct the dynamic balance of the rotor 20, so that the vibration of the rotor 20 can be further suppressed.

The present disclosure is not limited to the above-described example embodiment, and the following configuration may be employed. The auto-balancer is not particularly limited as long as dynamic balance of the rotor can be automatically corrected. The auto-balancer may be provided on the shaft in its portion closer to one side in the axial direction than a portion with the rotor body fixed, i.e., in its portion positioned above the portion with the rotor body. In other words, the auto-balancer is provided on the shaft in its portion closer to one side in the axial direction than its portion with the rotor body fixed and closer to the other side in the axial direction than the propeller mounting part. The movable body of the auto-balancer is not particularly limited as long as it can move in the circumferential direction inside the housing portion, and may not be a sphere. The movable body may be a liquid, for example. The base of the auto-balancer may be a separate member from the shaft. The radially outer peripheral edge portion of the housing portion that houses the movable body may be positioned radially inward of the radially inner peripheral edge portion of the stator, or may be positioned radially outward of the housing. The motor may be mounted with a gimbal along with the auto-balancer. In this case, the auto-balancer and the gimbal can further suppress vibration generated in the motor.

The propeller mounting part is not particularly limited as long as the propeller is detachably attached thereto. The propeller mounting part may be a part of the shaft. In this case, the propeller mounting part is detachably attached to the shaft. The housing may not have each fin. The propeller is not particularly limited as long as it is detachably attached to the propeller mounting part. The propeller may have three or more blades.

While in the example embodiment described above, the motor 10 is an inner rotor type motor, the motor 10 is not limited thereto. The kind of motor is not particularly limited as long as the motor is mounted in a drone. The motor may be an outer rotor type motor. While in the example embodiment described above, the rotor device 1 is configured to generate a vertical propulsive force by rotating the propeller 2, the rotor device 1 is not limited thereto. For example, the rotor device may be configured to generate a horizontal propulsive force by rotating a propeller. In this case, the rotor rotates about a central axis extending in the horizontal direction. The drone is not particularly limited as long as it includes a rotor device. The number of rotor devices mounted on the drone is not particularly limited. The drone may be mounted with one or more and three or less rotor devices, and may be mounted with five or more rotor devices. The drone may include no imaging device. The use of the drone is not particularly limited.

Each of the structures described herein can be combined suitably in the range consistent with each other.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor mounted on a drone, the motor comprising:
    a rotor including a propeller mounting portion with a propeller detachably attached, the rotor is structured to rotate about a central axis;
    a stator facing the rotor in a radial direction with a gap between the stator and the rotor; and
    an auto-balancer capable of automatically correcting dynamic balance of the rotor; wherein
    the auto-balancer includes:
        a base including a housing portion which has a circular shape extending around the central axis; and
        a movable body which is located inside of the housing portion, the movable body moves freely in an annular area defined entirely around the central axis within the housing portion in a circumferential direction.

2. The motor according to claim 1, wherein the rotor includes:
    a shaft disposed along the central axis; and
    a rotor body fixed to the shaft;
    the propeller mounting portion is provided on the shaft closer to one side in an axial direction than a portion with the rotor body fixed; and the auto balancer is provided on the shaft closer to the other side in the axial direction than the portion with the rotor body fixed.

3. The motor according to claim 2, further comprising:
a housing to house the rotor and the stator; wherein
the stator surrounds the rotor from radially outside the rotor;
the base is provided on the shaft in a portion protruding toward the other end in the axial direction from the housing; and
the housing portion includes a radially outer peripheral edge portion positioned radially outward of a radially inner peripheral edge portion of the stator.

4. The motor according to claim 3, wherein the base and the shaft are integrally formed together as a single monolithic member.

5. The motor according to claim 3, wherein the housing includes:
a top wall portion positioned closer to the one side in the axial direction than the stator; and
a plurality of fins provided on a surface of the top wall portion, closer to the one side in the axial direction.

6. The motor according to claim 1, wherein the rotor includes:
a shaft disposed along the central axis; and
a rotor body fixed to the shaft;
the propeller mounting portion is provided on the shaft in a portion positioned closer to the one side in the axial direction than the portion with the rotor body fixed; and
the auto balancer is provided on the shaft in a portion positioned closer to the one side in the axial direction than the portion with the rotor body fixed and closer to the other side in the axial direction than the propeller mounting portion.

7. A rotor device comprising:

the motor according to claim 1; and the propeller.

8. A drone comprising:

the rotor device according to claim 7.

9. The drone according to claim 8, wherein a plurality of the rotor devices is provided.

10. The motor according to claim 1, wherein the movable body is below an underside of the base; and the auto-balancer further includes a circular lid which closes an annular opening of the housing portion on the underside of the base.

* * * * *